United States Patent
Hurd et al.

(10) Patent No.: US 12,100,072 B2
(45) Date of Patent: Sep. 24, 2024

(54) TINTING MATERIAL ON AN INTERFACE

(71) Applicant: Microsoft Technology Licensing, LLC, Redmond, WA (US)

(72) Inventors: Spencer Israel Antonin Nataraja Hurd, Seattle, WA (US); Chigusa Yasuda Sansen, Bellevue, WA (US); Christopher Nathaniel Raubacher, Redmond, WA (US); Simone Magurno, Seattle, WA (US); Jeremy Scott Knudsen, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 17/827,691

(22) Filed: May 28, 2022

(65) Prior Publication Data
US 2023/0386097 A1    Nov. 30, 2023

(51) Int. Cl.
*G06T 11/00* (2006.01)
*G06F 3/04845* (2022.01)

(52) U.S. Cl.
CPC ........ *G06T 11/001* (2013.01); *G06F 3/04845* (2013.01); *G06T 2200/24* (2013.01)

(58) Field of Classification Search
CPC .............. G06T 11/001; G06T 2200/24; G06F 3/04845
See application file for complete search history.

(56) References Cited

U.S. PATENT DOCUMENTS

| 8,091,038 | B1 | 1/2012 | Johnson et al. |
| 8,264,499 | B1 * | 9/2012 | Landry ................ H04N 9/76 715/275 |
| 9,245,381 | B2 | 1/2016 | Howell |
| 10,175,871 | B2 | 1/2019 | Kocienda et al. |
| 10,949,073 | B2 | 3/2021 | Conn et al. |

(Continued)

FOREIGN PATENT DOCUMENTS

KR    100661544 B1    12/2006

OTHER PUBLICATIONS

Hickey, et al., "Mica Material", Retrieved from: https://docs.microsoft.com/en-us/windows/apps/design/style/mica, Mar. 1, 2022, 17 Pages.

(Continued)

*Primary Examiner* — Kee M Tung
*Assistant Examiner* — Jed-Justin Imperial
(74) *Attorney, Agent, or Firm* — Barta Jones, PLLC (57) ABSTRACT

A tinting material may be generated and applied to the backdrop of an application presented on a user interface. The user interface is presented on a display and includes a background. The background comprises a first color, which includes a luminosity value, a hue value, and a saturation value. A tint color, having a luminosity value, a hue value, a saturation value, and an opacity value, is received. The luminosity value of the first color is modified to generate a second color, and the hue value and saturation value of the generated second color are modified to generate a third color. A tinting material color is generated that includes the modified luminosity value of the second color, the modified hue value of the third color, and the modified saturation value of the third color, and an application is presented on the user interface that includes the tinting material color.

19 Claims, 4 Drawing Sheets

(56) References Cited

U.S. PATENT DOCUMENTS

2009/0303261 A1* 12/2009 Fard .................. H04N 1/603
                                                  345/690
2017/0139474 A1*  5/2017 Rochford ............... G06F 3/017
2022/0342488 A1* 10/2022 Jutan .................. G06F 3/0488

OTHER PUBLICATIONS

Leghari, Abdullah, "Windows 11 Mica Material", Retrieved from: https://github-wiki-see.page/m/Leghari-K/MicaMaterial/wiki/Windows-11-Mica-Material, Dec. 22, 2021, 7 Pages.

Morales, Jowi, "Microsoft Rolls Out the Mica Blur Effect for Office Insiders in Windows 11: Here's How to Get It", Retrieved from: https://www.makeuseof.com/microsoft-rolls-out-mica-effect-how-to-get-it/, Nov. 27, 2021, 11 Pages.

"International Search Report and Written Opinion Issued in PCT Application No. PCT/US23/018240", Mailed Date: Jul. 21, 2023, 16 Pages.

Tkachenko, Sergey, "Change Color of Inactive Title Bars in Windows 10", Retrieved From: https://winaero.com/change-color-of-inactive-title-bars-in-windows-10/, Apr. 25, 2016, 4 Pages.

* cited by examiner

TINTING MATERIAL ON AN INTERFACE

BACKGROUND

A user interface on a display presents content, including a desktop background that may include a background color and an image or logo, and one or more application interfaces at a time. However, the presentation of an application overlaid on the desktop background can appear distracting to a user when the background of the application is presented in a color that clashes or contrasts with the color presented on the desktop background.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples and implementations disclosed herein are directed to systems and methods for generating a tinting material on an interface. The method includes presenting, on at least one display, a user interface including a background, the background including a first color, wherein the first color includes a luminosity value, a hue value, and a saturation value; receiving at least one tint color having a luminosity value, a hue value, a saturation value, and an opacity value; modifying the luminosity value of the first color based on the opacity value of the at least one tint color to generate a second color; modifying the hue value and the saturation value of the generated second color based on the opacity value of the at least one tint color to generate a third color; generating a tinting material color that includes the modified luminosity value of the second color, the modified hue value of the third color, and the modified saturation value of the third color; and presenting, on the user interface, a user interface surface including a backdrop section, the backdrop section comprising the tinting material color.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

In some instances, the presentation of a user interface lacks visual continuity between a surrounding environment, such as a desktop background or wallpaper, and the appearance of the rest of the user interface, including an application. For example, an application overlaid on the desktop background can appear distracting when the background of the application is presented in a color that clashes or contrasts with the color presented on the desktop background. This issue is particularly prevalent when multiple applications are presented on the user interface at one time. Not only may the plurality of applications result in an overwhelming visual presentation, but it may be difficult for a user to distinguish which of the applications is in focus and in an active state at a particular time.

The present disclosure addresses these and other deficiencies by presenting a tinting material that appears on the backdrop of the application. The tinting material is an opaque material that incorporates a theme of the user interface, desktop background, and/or wallpaper to create a highly personalized appearance on the user interface. As an application window is moved across the display, the tinting material may dynamically adapt to create a rich visualization using the color of the desktop background or wallpaper underneath the application. In addition, the tinting material enables the user to better focus on the current task by falling back to a neutral color when the application is inactive.

Current solutions fail to sufficiently address these challenges. Current solutions may merely attempt to blur out an image on the desktop background or present a transparent backdrop on an application. These solutions fail to present an opaque material in a color derived from the original desktop background color and/or may distort the desktop background such that the application appearance is obviously distorted. Other solutions may attempt to frequently sample the color of content presented behind an application, including the background color or the color of another application, which consumes significant resources in terms of processing power and can result in constant updates to the color of the backdrop of the application, which presents additional challenges and distractions to a user.

In addition, current solutions require significant processing power to regularly implement. For example, blurring out the image on the desktop background or presenting the transparent backdrop on the application requires updating each time the application is moved on the interface, updated on the interface, and so forth, which requires significant battery usage and processing power. The present disclosure presents a tinting material that is updated when the desktop background or wallpaper is updated with a different color, which provides minimal impact to battery usage and processing power of the electronic device.

Various examples presented herein refer to a desktop background and a wallpaper. As referenced herein, a desktop background, also referred to as a background, refers to a background of a user interface, such as a home screen upon which various windows, icons, folders, and other content may be presented. In some instances, the desktop background may include a wallpaper, which presents one or more images on the desktop background.

Figure 1:
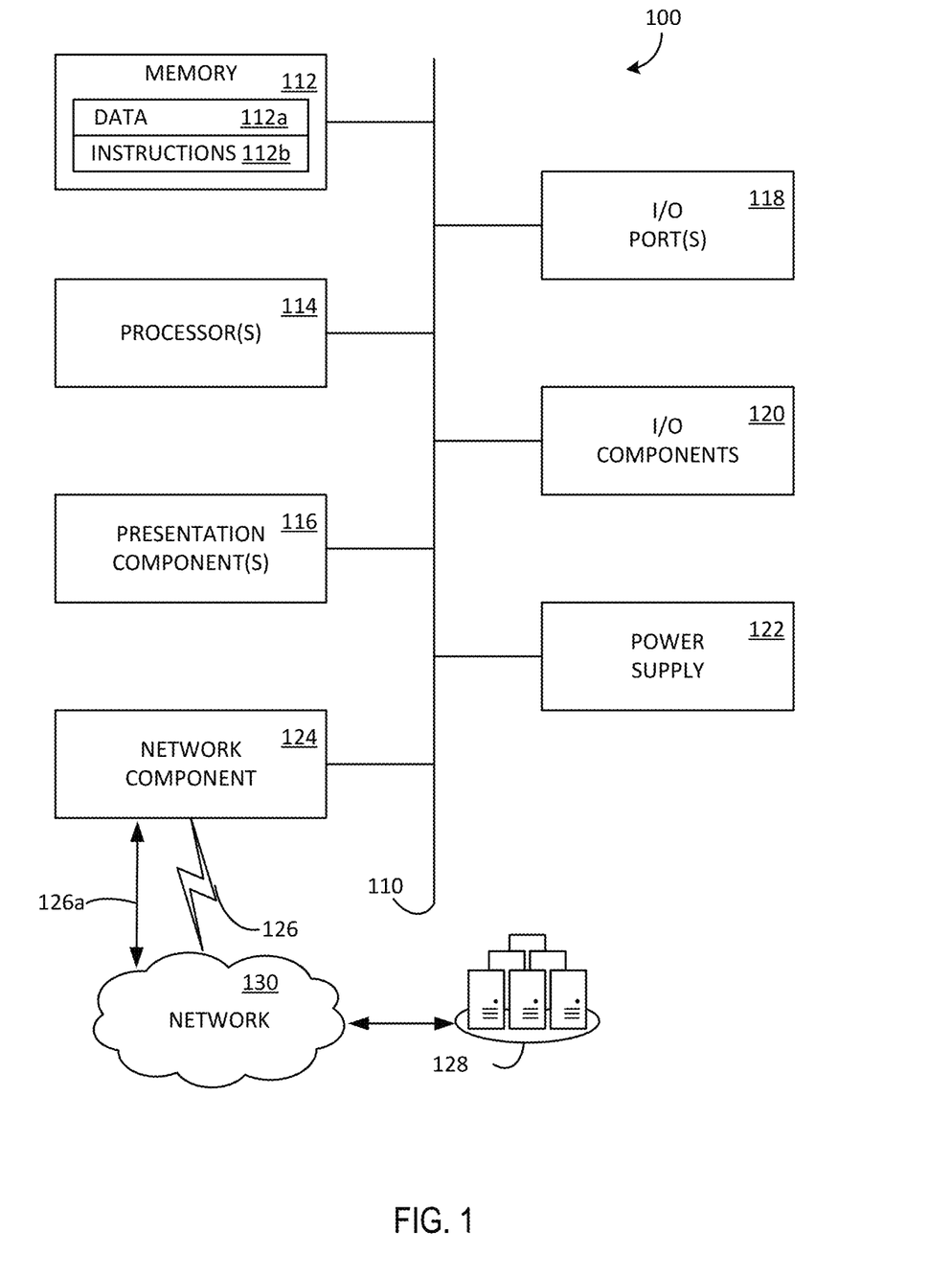
FIG. 1 is a block diagram illustrating an example computing device for implementing various examples of the present disclosure.

FIG. 1 is a block diagram illustrating an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should the computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, virtual machines (VMs), mobile tablets, hand-held devices, consumer electronics, specialty computing devices, etc. The disclosed examples may also be practiced in distributed computing environments when tasks are performed by remote-processing devices that are linked through a communications network.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112a and instructions 112b that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif, ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor 114, by multiple processors 114 within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

Figure 2:
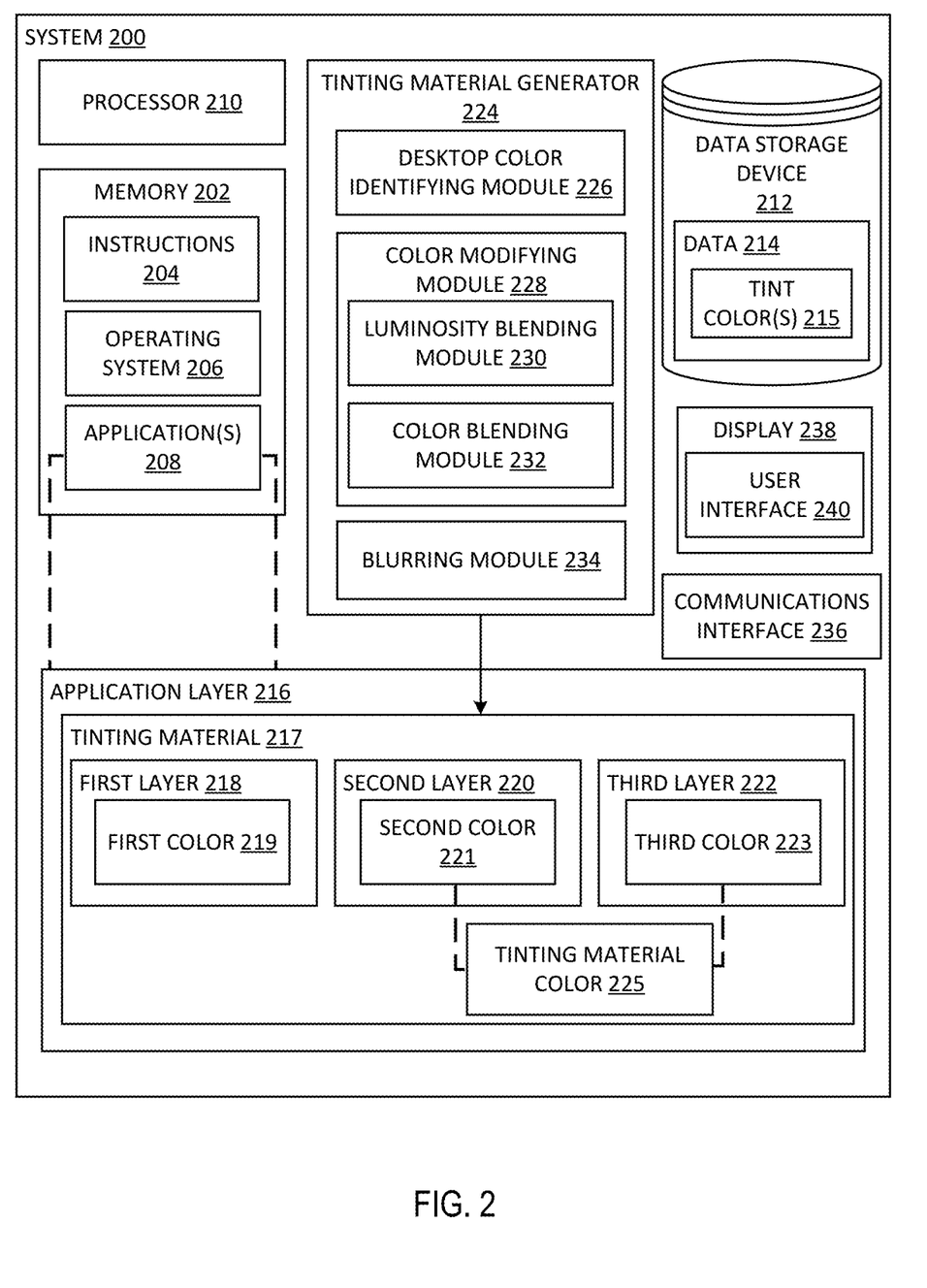
FIG. 2 is a block diagram illustrating an example system for generating and presenting a tinting material on an interface according to various examples of the present disclosure.

As described herein, the computing device 100 may be implemented as one or more electronic devices such as servers, laptop computers, desktop computers, mobile electronic devices, wearable devices, tablets, and so forth. The computing device 100 may be implemented as a system 200 as described in greater detail below.

FIG. 2 is a block diagram illustrating an example system for generating and presenting a tinting material on an interface according to various examples of the present disclosure. The system 200 may include the computing device 100. In some implementations, the system 200 is presented as a single computing device that contains each of the components of the system 200. In some implementations, the system 200 includes one or more electronic devices.

The system 200 includes a memory 202, a processor 210, a data storage device 212, a tinting material generator 224, a communications interface 236, a display 238, and a user interface 240. The memory 202 stores instructions 204 executed by the processor 210 to control the tinting material generator 224, the communications interface 236, and the display 238. The memory further stores an operating system (OS) 206. The OS 206 may be executed by the processor 210 and/or one or more elements implemented on the processor 210 to control one or more functions of the system 200.

The memory 202 further stores data, such as instructions for one or more applications 208. An application 208 is a program designed to carry out a specific task on the system 200. For example, the applications 208 may include, but are not limited to, drawing applications, paint applications, web browser applications, messaging applications, navigation/mapping applications, word processing applications, game applications, an application store, applications included in a suite of productivity applications such as calendar applications, instant messaging applications, document storage applications, video and/or audio call applications, and so forth, and specialized applications for a particular system 200. The applications 208 may communicate with counterpart applications or services, such as web services. In some implementations, each application 208 includes an application layer 216. In some implementations, the application 208 is an example of a user interface surface. For example, a user interface surface may be any aspect of content or background content presented on the user interface 240. The application layer 216 may include a tinting material 217 comprising a first layer 218, a second layer 220, and a third layer 222. The first layer 218 may be a desktop-level layer, the second layer 220 may be a luminosity blend mode layer, and the third layer 222 may be a color blend mode layer. The application layer 216, including the tinting material 217, is described in greater detail below.

The processor 210 executes the instructions 204 stored on the memory 202 to perform various functions of the system 200. For example, the processor 210 controls the communications interface 236 to transmit and receive various signals and data and controls the data storage device 212 to store particular data 214. In some implementations, other elements of the system 200, such as the tinting material generator 224, are implemented on the processor 210 to perform specialized functions. For example, the tinting material generator 224 controls one or more elements, such as the desktop color identifying module 226, the color modifying module 228, and the blurring module 234, to perform specialized functions as described herein.

The data storage device 212 stores data 214. The data 214 may include any data, including data related to one or more of the applications 208 and data generated by the one or more of the desktop color identifying module 226, the color modifying module 228, and the blurring module 234.

In some implementations, the system 200 further includes a display 238. The display 238 may be an in plane switching (IPS) liquid-crystal display (LCD), an LCD without IPS, an organic light-emitting diode (OLED) screen, or any other suitable type of display. In some implementations, the display 238 is integrated into a device comprising the system 200, such as a display 238 of a laptop computer. In some implementations, the display 238 is presented external to one or more components included in the system 200, such as an external monitor or monitors. The user interface 240 presents content on the display 238. For example, the user interface 240 may present content of one or more applications 208 that includes a tinting material 217 generated by the tinting material generator 224.

The tinting material 217 is a background material applied to an application 208 presented on the user interface 240. The tinting material 217 is presented on the user interface 240 as a portion of the application layer 216 and includes the first layer 218, the second layer 220, and the third layer 222. In some implementations, the tinting material 217 is applied to an application backdrop to create visual hierarchy that aids productivity by increasing clarity about which window is in focus on the user interface 240. In other words, the tinting material 217 is applied to the application backdrop so that the application 208 appears to live more in the environment of the desktop background of the user interface 240, rather than as a standalone feature or element. In some implementations, the tinting material 217 is also referred to as a performant rendering, a performant material, a personalized backdrop rendering, an environmental material, a power-efficient material, or a battery-efficient material.

The tinting material 217 is generated by the tinting material generator 224. The tinting material generator 224 includes a desktop color identifying module 226. The desktop color identifying module 226 identifies a primary color of a desktop background presented on the user interface 240. For example, the desktop background may be a solid color, an image presented on a solid color, or image comprising several colors. The first layer 218, as described herein, may represent the desktop background. In some implementations, the desktop color identifying module 226 identifies the color of the first layer 218. In implementations where the first layer 218 includes a variety of colors, the desktop color identifying module 226 identifies a primary color of the first layer 218.

In some examples, the first layer 218 may include an image presented on a first color or colors 219. The tinting material generator 224 includes a blurring module 234 that, in some implementations, applies a blurring filter to the first layer 218 that blurs the image presented on the first color. 219 The blurring filter may be a filter that intentionally makes the image less clear or distinct. For example, the blurring filter may remove details of the image at one or more spatial frequencies. In another example, the blurring filter may be a Gaussian blur. By applying the blurring filter, the first layer 218 is modified in such a way that the image is no longer recognizable, but the first color 219 identified by the desktop color identifying module 226 persists.

The tinting material generator 224 further includes a color modifying module 228. The color modifying module 228 modifies the first color 219 of the background image by implementing one or both of a luminosity blending module 230 and a color blending module 232. For example, the background image may be included in a wallpaper that is overlaid on at least a portion of the desktop background. The luminosity blending module 230 adjusts, or modifies, the luminosity of the first color 219 to generate a second color 221, and the color blending module 232 adjusts the hue and saturation of the second color 221 to generate a third color 223. The third color 223 is implemented as the color of the tinting material 217. Each of the first color 219, the second color 221, and the third color 223 include values for luminosity (L), hue (H), saturation (S), and opacity (O). The luminosity is the brightness of the respective color and may be referred to as an L value. An L value may range from 0 to 100, where 0 represents the lowest luminosity, i.e., brightness, and 100 represents the highest luminosity. An H value may range from 0 to 100, where 0 represents the lowest hue and 100 represents the highest hue. An S value may range from 0 to 100, where 0 represents the lowest saturation and 100 represents the highest saturation.

As referenced herein, luminosity refers to a brightness of a particular color. The luminosity blending module 230 adjusts the background luminosity of the first color 219 to more closely resemble one or more tint colors 215. The tint color 215 may be a predetermined, or preset, color that is supplied and stored as data 214 in the data storage device 212. In some implementations, the tint color 215 is set by the operating system 206. In other implementations, the tint color 215 may be updated, or changed, manually by a user of the system 200. Like the first color 219, the second color 221, and the third color 223, the tint color 215 also includes include values for luminosity (L), hue (H), saturation (S), and opacity (O) ranging from 0 to 100 as described herein. In some implementations, the tint color 215 includes a single tint color 215. In other implementations, the tint color 215 includes more than one tint color 215. For example, the tint color 215 may include a first tint color 215 including a first L value, a first H value, a first S value, and a first 0 value, and a second tint color 215 including a second L value, a second H value, a second S value, and a second 0 value. In one example, the first tint color 215 and the second tint color 215 include identical luminosity, hue, and saturation values, but different opacity values.

The tint color 215 is provided to the second layer 220 and the third layer 222. In some implementations, the tint color 215 values for luminosity (L), hue (H), saturation (S), and opacity (O) supplied to each of the second layer 220 and the third layer 222 are the same. In other implementations, the tint color 215 values for luminosity (L), hue (H), saturation (S), and opacity (O) supplied to each of the second layer 220 and the third layer 222 are different. For example, a first tint color 215 may be provided to the second layer 220 while a second tint color 215, having a different opacity value than the first tint color 215, may be provided to the third layer 222.

The luminosity blending module 230 adjusts, or pushes, the luminosity of the first color 219 toward the tint color 215 to a degree that is dependent upon the opacity of the tint color 215. The luminosity blending module 230 adjusts the luminosity of the first color 219 to a greater degree where the opacity of the tint color 215 is relatively higher and adjusts the luminosity of the first color 219 to a lesser degree where the opacity of the tint color 215 is relatively lower. For example, consider an L value of the first color 219 equal to 64 and an L value of the tint color 215 equal to 50. Where the opacity of the tint color 215 is equal to 100, the L value of the first color 219 is adjusted to 50, to completely match the L value of the tint color 215. In other words, where the tint color 215 is completely opaque, indicated by the opacity value of 100, the L value of the first color 219 is completely replaced. However, where the opacity of the tint color 215 is equal to 50, i.e., fifty percent opaque, the L value of the first color 219 is adjusted to 57, or halfway from 64 to 57. Accordingly, the higher the opacity value of the tint color 215, the more the luminosity blending module 230 adjusts the luminosity of a pixel from the original color, i.e., the first color 219 in this instance, to match the luminosity of the tint color 215. The result of the adjusted luminosity of the first color 219 is the luminosity of the second color 221 generated by the second layer 220. It should be understood that the examples of adjusting the luminosity values as presented herein are presented for illustration only and should not be construed as limiting. The luminosity values of the first color 219 may be adjusted using a different method or to different degrees than the particular examples presented herein without departing from the scope of the present disclosure.

The color blending module 232 adjusts, or pushes, the hue and saturation of the second color 221 toward the tint color 215 to a degree that is dependent upon the opacity of the tint color 215. The color blending module 232 adjusts the hue and saturation of the second color 221 to a greater degree where the opacity of the tint color 215 is relatively higher and adjusts the hue and saturation of the second color 221 to a lesser degree where the opacity of the tint color 215 is relatively lower. For example, consider the H value of the second color 221 is equal to 64 and the H value of the tint color 215 is equal to 50. Where the opacity of the tint color 215 is equal to 100, the H value of the second color 221 is adjusted to 50, to completely match the H value of the tint color 215. In other words, where the tint color 215 is completely opaque, indicated by the opacity value of 100, the H value of the second color 221 is completely replaced. However, where the opacity of the tint color 215 is equal to 50, i.e., fifty percent opaque, the H value of the second color 221 is adjusted to 57, which is halfway from 64 to 57. Accordingly, the higher the opacity value of the tint color 215, the more the color blending module 232 adjusts the hue of a pixel from the second color 221 to match the hue of the tint color 215. The result of the adjusted hue of the second color 221 is the hue of the third color 223 generated by the third layer 222.

As another example, consider the S value of the second color 221 is equal to 64 and the S value of the tint color 215 is equal to 50. Where the opacity of the tint color 215 is equal to 100, the S value of the second color 221 is adjusted to 50, to completely match the S value of the tint color 215. In other words, where the tint color 215 is completely opaque, indicated by the opacity value of 100, the S value of the second color 221 is completely replaced. However, where the opacity of the tint color 215 is equal to 50, i.e., fifty percent opaque, the S value of the second color 221 is adjusted to 57, which is halfway from 64 to 57. Accordingly, the higher the opacity value of the tint color 215, the more the color blending module 232 adjusts the saturation of a pixel from the second color 221 to match the saturation of the tint color 215. The result of the adjusted saturation of the second color 221 is the saturation of the third color 223 generated by the third layer 222. It should be understood that the examples of adjusting the hue and saturation values as presented herein are presented for illustration only and should not be construed as limiting. The hue and saturation values of the second color 221 may be adjusted using a different method or to different degrees than the particular examples presented herein without departing from the scope of the present disclosure.

Accordingly, the luminosity blending module 230 generates the second color 221 based on the first color 219 and the color blending module 232 generates the third color 223 based on the generated second color 221. By generating the third color 223 in two steps, i.e., creating an intermediate second color 221, the tinting material generator 224 is able to independently adjust i) the luminosity and ii) the hue and saturation of the first color 219 based on potentially different opacities. For example, as described herein, the first tint color 215 supplied to the second layer 220 to adjust the luminosity value may have a different opacity than the second tint color 215 supplied to the third layer 222 to adjust the hue and saturation values.

The color modifying module 228 then combines the second color 221 and the third color 223 to generate a tinting material color 225 that is used as the color of the tinting material 217. For example, the tinting material 217 is provided on the user interface 240 with the tinting material color 225 that includes the luminosity of the second color 221, the hue of the third color 223, and the saturation of the third color 223. The tinting material 217 is used as a background for an application layer 216 of an application 208 presented on the user interface 240. Because the tinting material 217 is initially based on the first color 219 from the theme of the desktop background and wallpaper presented on the user interface 240, the tinting material 217, including the tinting material color 225, incorporates the theme of the desktop background and wallpaper to create a personalized appearance on the application layer 216. The tinting material 217 may dynamically adapt to create a rich visualization using the wallpaper underneath the application layer 216 as the window for the application layer 216 moves across the user interface 240. The tinting material 217 may additionally provide improved focus to a user viewing the user interface 240 by falling back to a neutral color when the particular application 208 is inactive, i.e., not in focus on the user interface 240, as described in greater detail below with regards to FIG. 4. In some examples, the neutral color is the original application color, such as the color of the application background prior to any adjustments to the luminosity, hue, and saturation values. In other examples, the neutral color may be a predefined color that is specifically used for applications that are inactive.

In some implementations, the color modifying module 228 further adds a gradient of color or animated color to the active application 208 in addition to the tinting material 217 to further emphasize that the particular application 208 is the active application, particularly where multiple applications 208 are at least partially visible on the user interface 240. In some implementations, the processor 210 may apply the tinting material 217 to other surfaces in addition to the application 208, including but not limited to a dialog box, a flyout, and so forth.

In some implementations, the tinting material generator 224 generates the tinting material 217 including the tinting material color 225 as described herein infrequently. For example, the tinting material generator 224 may update the tinting material color 225 upon startup of the operating system 206, such as when a computing device including the components of the system 200 is turned on. In another example, the tinting material generator 224 may update the tinting material color 225 upon the first color 219 being changed, or updated, such as when the desktop background is changed. In yet another example, the tinting material generator 224 may update the tinting material color 225 at a regular interval, such as every hour, every two hours, every twelve hours, every twenty-four hours, and so forth.

Figure 3:
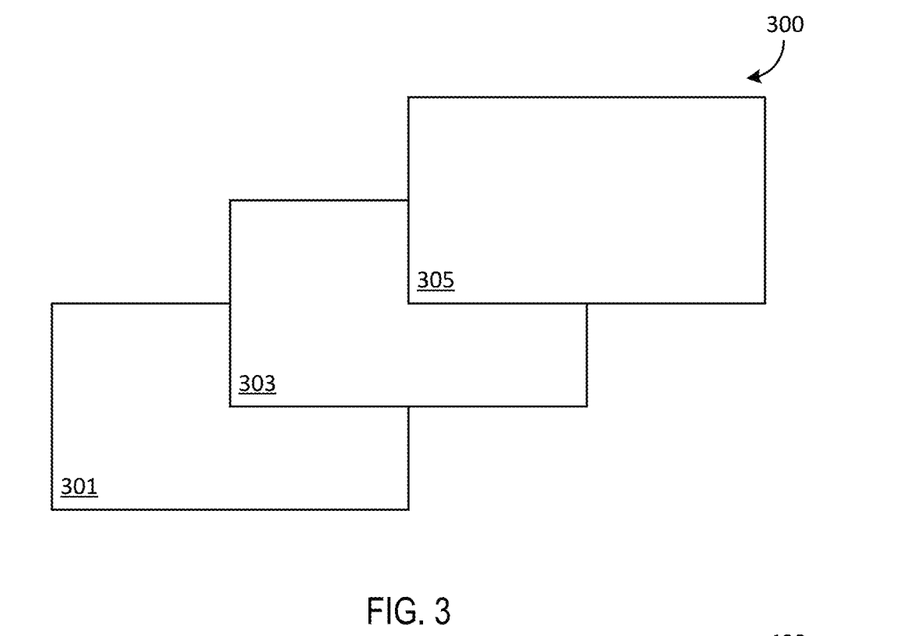
FIG. 3 illustrates a perspective view of various layers of an application according to various examples of the present disclosure.

FIG. 3 illustrates a perspective view of various layers of an application according to various examples of the present disclosure. The example of the application illustrated in FIG. 3 is for illustration only and should not be construed as limiting. Various examples of the application may be used without departing from the scope of the present disclosure. In some examples, the application illustrated in FIG. 3 is the application layer 216.

The perspective view 300 illustrates a first layer 301, a second layer 303, and a third layer 305. In some examples, the first layer 301 is referred to as a bottom layer, the second layer 303 is referred to as a middle layer, and the third layer 305 is referred to as a top layer. The first layer 301 may be the first layer 218, the second layer 303 may be the second layer 220, and the third layer 305 may be the third layer 222.

The first layer 301 illustrates the wallpaper presented on a user interface 240. The wallpaper may include an image, a logo, or other graphic presented on at least a portion of a color, such as the first color 219, of the desktop background. In some examples, the wallpaper includes a static image that does not change, exclusive of the wallpaper being updated to a new wallpaper. In other examples, the wallpaper may be a code-driven dynamic wallpaper or video that is presented on the desktop background. In some examples, the wallpaper may include more than one background color. The first layer 301 may be updated periodically, for example when the wallpaper is changed. In some examples, the first layer 301 may be changed manually, such as a user manually selecting a new wallpaper. In other examples, the first layer 301 may be automatically updated at a regular interval, such as in instances where the wallpaper is set to cycle through a plurality of images and/or background colors at regular intervals.

In some examples, the first layer 301 is blurred by the blurring module 234. For example, the blurring module 234 may remove details of the image or logo presented on the first layer 301, rendering the image less distinct but retaining the color profile of the background color. As described herein, the blurring module 234 may implement a blurring filter on the first layer 301 to blur the image.

The second layer 303 may be the second layer 220 upon which the luminosity blending module 230 adjusts the luminosity of the background color on the first layer 301, i.e., the first color 219. The second layer 303 receives a first tint color 215 that includes values for each of luminosity (L), hue (H), saturation (S), and opacity (O). The opacity value of the first tint color 215 indicates a degree to which the luminosity blending module 230 adjusts the luminosity of the first color 219 to generate the second color 221. In other words, the luminosity blending module 230 provides the background color to the first tint color 215 supplied to the second layer 303.

The third layer 305 may be the third layer 222 upon which the color blending module 232 adjusts the hue and saturation of the generated second color 221. The third layer 305 receives a second tint color 215 that includes values for each of luminosity (L), hue (H), saturation (S), and opacity (O). The opacity value of the second tint color 215 indicates a degree to which the color blending module 232 adjusts the hue and saturation of the second color 221 to generate the third color 223. In other words, the color blending module 232 provides the second color 221 to the second tint color 215 supplied to the third layer 305. The generated third color 223 and the generated second color 221 are then combined to generate a color for the tinting material 217.

The colors of the second layer 303 and the third layer 305 are combined in order to generate the tinting material color 225. As described herein, the color modifying module 228 combines the second color 221 and the third color 223 to generate a tinting material color 225 that includes the luminosity of the second color 221, the hue of the third color 223, and the saturation of the third color 223 and is used as the color of the tinting material 217. This provides multiple advantages. First, the application layer 216 is presented to coordinate with a color of the operating system 206 desktop background by appearing tinted by the first color 219, rather than transparent or translucent. This is an aesthetic improvement as well as a functional improvement, because the tinting material color 225 enables improved user focus on the area of the user interface 240 with the focused application 208. Second, the tinting material 217 is not required to be frequently updated, because the tinting material color 225 is not dependent upon a color of an additional application presented behind the application 208 in focus on the user interface 240 or a variety of colors included in an image presented on the desktop background of the user interface 240. By infrequently updating the tinting material 217, performance of the system 200 is improved by the providing technical advantages of improved focus while minimizing the processing power consumption required to provide the advantage.

Figure 4:
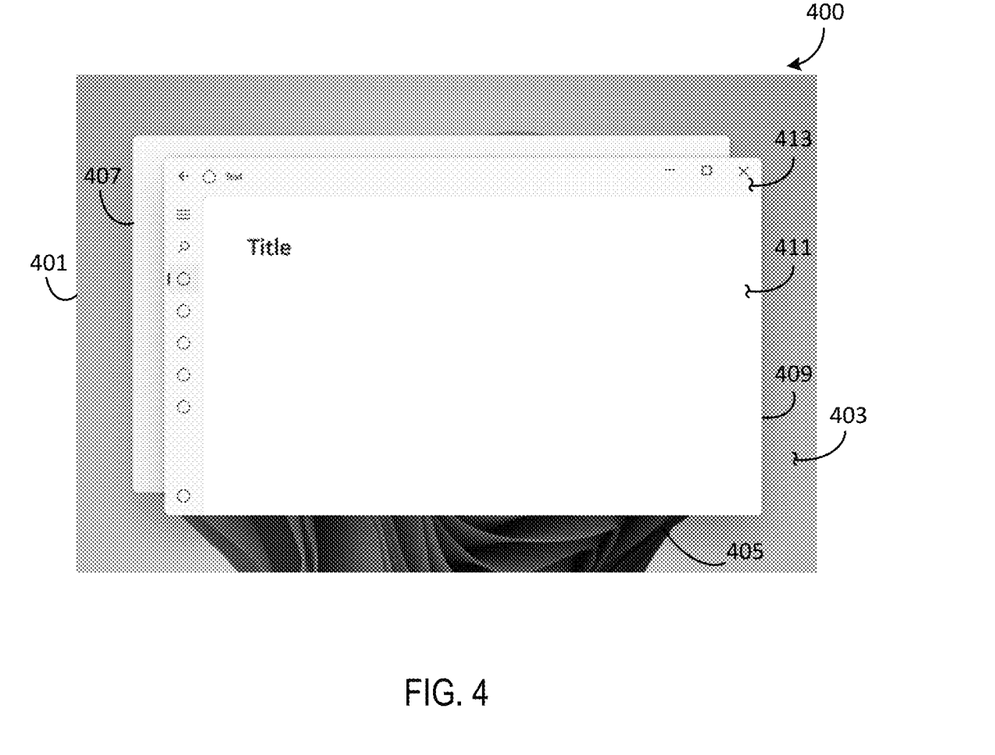
FIG. 4 illustrates an example user interface including a tinting material according to various examples of the present disclosure.

FIG. 4 illustrates an example user interface including a tinting material according to various examples of the present disclosure. The example of the user interface illustrated in FIG. 4 is for illustration only and should not be construed as limiting. Various examples of the user interface may be used without departing from the scope of the present disclosure. For example, various elements may be added to the example user interface, removed from the example user interface, rearranged on the example user interface, and so forth without departing from the scope of the present disclosure.

FIG. 4 illustrates an example user interface 400. The user interface 400 may be an example of the user interface 240 presented on display 238. The user interface 400 includes a background 401. The background 401 may be an example of a desktop background. The background 401 comprises a background color 403 and an image 405. The background color 403 may be an example of the first color 219 described herein. The image 405 may be any image, logo, etc. overlaid on the background color 403. In some examples, the background color 403 and the image 405 may be selected and changed separately. For example, the image 405 may be updated without updating the background color 403 and the background color 403 may be updated without updating the image 405.

The user interface 400 further includes a first application 407 and a second application 409. Each of the first application 407 and the second application 409 may be examples of an application 208 as described herein. The first application 407 is illustrated in FIG. 4 as not in focus on the user interface 400, and is therefore presented as a neutral color distinct from a color of the second application 409. By presenting the first application 407 in a distinct, neutral color, the second application 409 is more clearly presented as the application in focus on the user interface 400.

The second application 409 includes a content section 411 and a backdrop section 413. The content section 411 is the area of the second application 409 in which application-specific content is displayed. As illustrated in FIG. 4, the content section 411 presents a "Title" which may be modified to include a title of the document or project in the second application 409.

However, this example is presented for illustration only and should not be construed as limiting. The content section 411 may present any type of content specific to the particular application, including but not limited to applications 208 that present one or more of text, images, videos, .GIFs, software code, photo editing, video editing, entertainment, web browsing, operating system 206 settings, and so forth.

The backdrop section 413 presents a background for the second application 409. The backdrop section 413 includes a base layer for the second application 409 that is presented behind the content section 411. The backdrop section 413 may include the tinting material 217, including the generated tinting material color 225. For example, the backdrop section 413 may be presented as an opaque or a semi-opaque material in the tinting material color 225 to personalize the appearance of the second application 409 based at least in part on the background color 403.

In some implementations, the first application 407 may become active and be brought into focus, pushing the second application 409 out of focus. In this example, the first application 407 is brought into focus presenting a backdrop section including the tinting material 217 and a content section 411 corresponding to the content presented by the particular application. The second application 409 is pushed out of focus and presented behind the first application 407 in the neutral color illustrated in FIG. 4 with reference to the first application 407.

Figure 5:
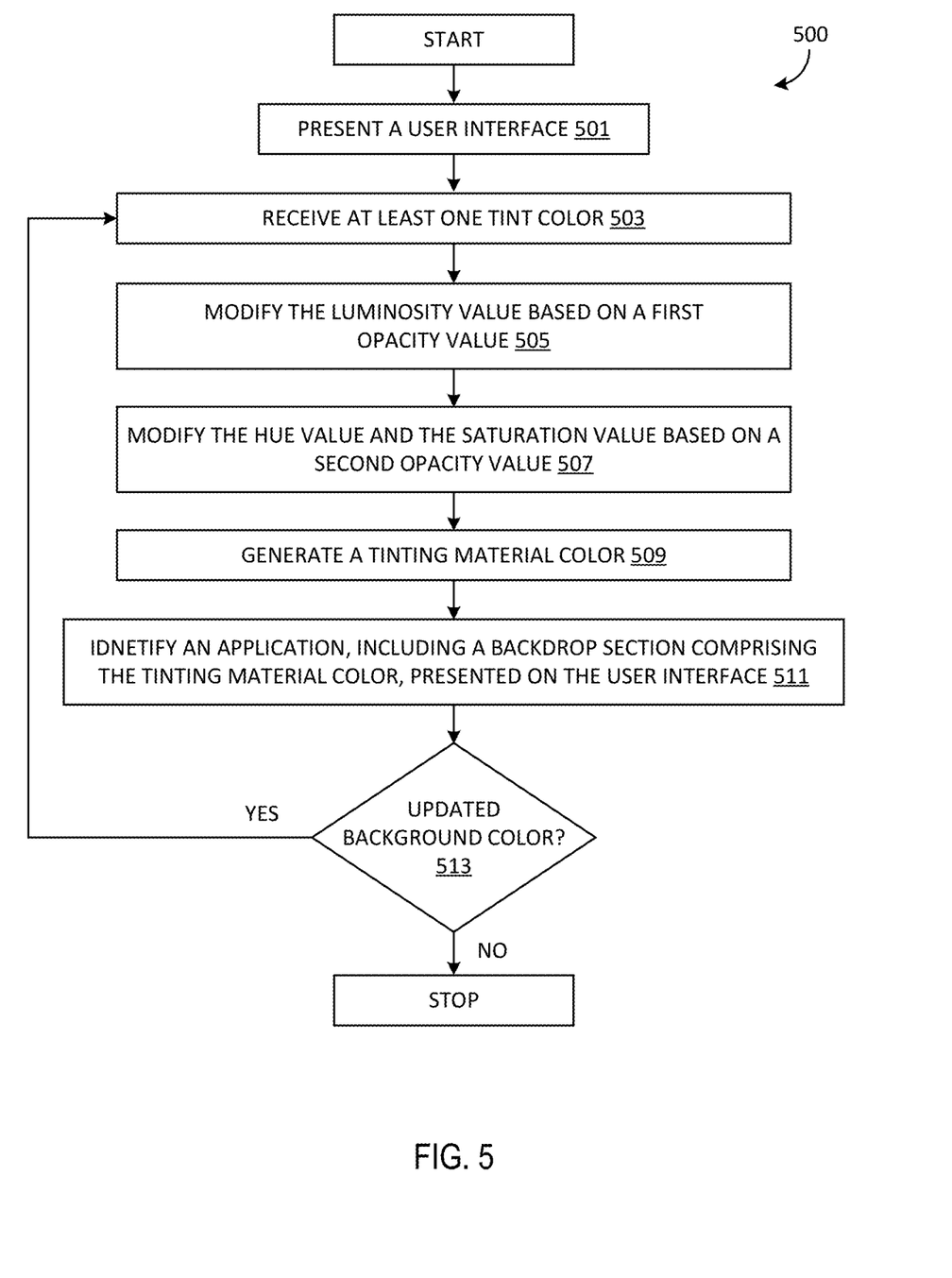
FIG. 5 illustrates a computer-implemented method of generating a tinting material according to various examples of the present disclosure.

FIG. 5 illustrates a computer-implemented method of generating a tinting material according to various examples of the present disclosure. The operations illustrated in FIG. 5 are for illustration and should not be construed as limiting. Various examples of the operations can be used without departing from the scope of the present disclosure. The operations of the flow chart 500 can be executed by one or more components of the system 200, including the processor 210, the application layer 216, the tinting material generator 224, and the display 238.

The flow chart 500 begins by the display 238 presenting the user interface 240 in operation 501. As described herein, the display 238 includes at least one display. The display 238 may be a single display, such as a screen of a laptop computer or a monitor, or more than one display, such as the screen of a laptop computer and a monitor or more than one monitor. The presented user interface 240 includes a background that includes a first color. For example, the first color may be the first color 219. As described herein, the first color 219 includes at least a luminosity value, a hue value, and a saturation value.

In some examples, the background further includes an image, such as the image 405, overlaid on the first color 219. In order to provide a more consistent tinting material color 225, the blurring module 234 may apply a blur layer or blurring filter to the background that blurs the image 405 overlaid on the first color 219. For example, by applying the blurring filter, the background is modified in such a way that the image 405 is no longer recognizable, but the first color 219 identified by the desktop color identifying module 226 persists.

In operation 503, the tinting material generator 224 receives at least one tint color 215. The at least one tint color 215 may include more than one tint color. For example, the tinting material generator 224 may receive a first tint color 215 having a luminosity value, a hue value, a saturation value, and an opacity value and a second tint color 215 having a luminosity value, a hue value, a saturation value, and an opacity value.

In operation 505, the tinting material generator 224 modifies the luminosity value of the first color 219 based on the opacity value of the first tint color. More particularly, the luminosity blending module 230 modifies the luminosity value of the first color 219 using the luminosity value of the first tint color 215. The luminosity value of the first color 219 may be increased or decreased in accordance with the opacity value of the first tint color 215. For example, as described herein, consider an L value of the first color 219 equal to 64 and an L value of the first tint color 215 equal to 50. Where the opacity of the first tint color 215 is equal to 100, the L value of the first color 219 is adjusted to 50, to completely match the L value of the first tint color 215. In other words, where the first tint color 215 is completely opaque, indicated by the opacity value of 100, the L value of the first color 219 is completely replaced. However, where the opacity of the first tint color 215 is equal to 50, i.e., fifty percent opaque, the L value of the first color 219 is adjusted to 57, which is halfway from 64 to 57. Accordingly, the higher the opacity value of the first tint color 215, the more the luminosity blending module 230 adjusts the luminosity of a pixel from the first color 215 to match the luminosity of the first tint color 215. As a result, the luminosity blending module 230 generates a second color, such as the second color 221, having the adjusted luminosity value, the original hue value, and the original saturation value.

In operation 507, the tinting material generator 224 modifies the hue value and the saturation value of the second color 221 based on the opacity value of the second tint color 215. More particularly, the color blending module 232 modifies the hue value and the saturation value of the second color 221 using the hue value and the saturation value of the second tint color 215. The hue value and the saturation value of the generated second color 221 are each increased in accordance with the opacity value of the second tint color 215.

For example, as described herein, consider an H value of the second color 221 equal to 64 and an H value of the second tint color 215 equal to 50. Where the opacity of the second tint color 215 is equal to 100, the H value of the second color 221 is adjusted to 50, to completely match the H value of the second tint color 215. In other words, where the second tint color 215 is completely opaque, indicated by the opacity value of 100, the H value of the second color 221 is completely replaced. However, where the opacity of the second tint color 215 is equal to 50, i.e., fifty percent opaque, the H value of the second color 221 is adjusted to 57, which is halfway from 64 to 57. Accordingly, the higher the opacity value of the second tint color 215, the more the color blending module 232 adjusts the hue of a pixel from the second color 221 to match the hue of the second tint color 215. The result of the adjusted hue of the second color 221 is the hue of the third color 223.

Similarly, consider an S value of the second color 221 equal to 64 and an S value of the second tint color 215 equal to 50. Where the opacity of the second tint color 215 is equal to 100, the S value of the second color 221 is adjusted to 50, to completely match the S value of the second tint color 215. In other words, where the second tint color 215 is completely opaque, indicated by the opacity value of 100, the S value of the second color 221 is completely replaced. However, where the opacity of the second tint color 215 is equal to 50, i.e., fifty percent opaque, the S value of the second color 221 is adjusted to 57, which is halfway from 64 to 57. Accordingly, the higher the opacity value of the second tint color 215, the more the color blending module 232 adjusts the saturation of a pixel from the second color 221 to match the saturation of the second tint color 215. The result of the adjusted saturation of the second color 221 is the saturation of the third color 223.

In operation 509, the tinting material generator 224 generates a tinting material color 225 comprising the modified luminosity value of the second color 221, the modified hue value of the third color 223, and the modified saturation value of the third color 223. For example, generating the tinting material color 225 may including combining the second color 221 and the third color 223 to generate the tinting material color 225.

In operation 511, the display 238 identifies an application 208 presented on the user interface 240. In some implementations, the application 208 is newly presented on the user interface 240. For example, the application 208 may be identified due to the application 208 being newly launched. In other implementations, the application 208 has been previously presented on the user interface 240, for example while one or more of the operations 503-509 are executed. For example, in response to a tinting material color being generated in operation 509, applications 208 presently executing on the user interface 240 may be identified in order to update the tinting material 217 of the respective applications 208. The application 208 may include a backdrop section, such as the backdrop section 413. The backdrop section 413 is presented as the tinting material color 225 having the modified luminosity value of the second color 221, the modified hue value of the third color 223, and the modified saturation value of the third color 223.

In operation 513, the tinting material generator 224 determines whether the background color, i.e., the first color 219, has been updated. In various examples, the first color 219 may be updated manually by a user or may be updated at a regular interval, such as where the desktop background cycles through various desktop backgrounds. In examples where an updated background color is identified, the flow chart 500 returns to operation 503 to receive at least one tint color in order to generate an updated tinting material color 225. In examples where an updated background color is not identified, the flow chart 500 terminates.

In some examples, a second application 208 is presented on the user interface 240. Where the second application 208 is determined to be active and in focus, the user interface 240 pushes the original application to an inactive status and updates at least the backdrop section 413 of the original application to a neutral color indicating the inactive status. In some implementations, only the backdrop section 413 of the original application is updated to the neutral color. In other implementations, the entirety of the original application is updated to the neutral color, including the backdrop section 413 and the content section 411.

An application 208 may be determined to be active and in focus based on various criteria. In some examples, the application 208 may be determined to be active and in focus based on the application 208 currently receiving an input. In some examples, the application 208 may be determined to be active and in focus based on the application 208 being the last application 208 to have received an input, even if the application 208 is not presently receiving an input. In some examples, the application 208 may be determined to be active and in focus based on the application 208 being manually selected by a user of the system 200. In some examples, the application 208 may be determined to be active and in focus based on the application 208 being opened and presented and on the user interface 240. For example, an application 208 may be automatically considered active and in focus upon the application 208 being launched.

Accordingly, the tinting material generator 224 generates the tinting material 217, including the tinting material color 225, infrequently. By performing the flow chart 500 infrequently, processing power consumption is minimized while providing an improved user experience through improved focus on an active application 208.

Additional Examples

Some examples herein are directed to a computer-implemented method of generating a tinting material on an interface, as illustrated by the flow chart 500. The method (500) includes presenting (501), on at least one display (238), a user interface (240) including a background, the background including a first color (219), wherein the first color includes a luminosity value, a hue value, and a saturation value; receiving (503) at least one tint color (215) having a luminosity value, a hue value, a saturation value, and an opacity value; modifying (505) the luminosity value of the first color based on the opacity value of the at least one tint color to generate a second color (221); modifying (507) the hue value and the saturation value of the generated second color based on the opacity value of the at least one tint color to generate a third color (223); generating (509) a tinting material color (225) that includes the modified luminosity value of the second color, the modified hue value of the third color, and the modified saturation value of the third color; and presenting, on the user interface, an application (208) including a backdrop section (413), the backdrop section comprising the tinting material color.

In some examples, the at least one tint color includes a first tint color having a first opacity value and a second tint color having a second opacity value.

In some examples, the computer-implemented method further comprises modifying the luminosity value of the first color based on the first opacity value; and modifying the hue value and the saturation value of the generated second color based on the second opacity value.

In some examples, the background further includes an image (405) overlaid on the first color, and the computer-implemented method further includes applying a blur layer to the background that blurs the image overlaid on the first color.

In some examples, the computer-implemented method further comprises updating the background presented on the user interface to include an updated background color; and in response to updating the background to the updated background color, generating an updated tinting material color.

In some examples, the computer-implemented method further comprises presenting a second application on the user interface, pushing the application to an inactive status, and in response to pushing the application to the inactive status, updating the backdrop section of the application to a neutral color indicating the inactive status.

In some examples, the tinting material color is presented on the user interface as a tinted version of the first color.

In some examples, the luminosity value of the first color is increased in accordance with the opacity value of the at least one tint color.

In some examples, the hue value and the saturation value of the generated second color are each increased in accordance with the opacity value of the at least one tint color.

In some examples, the menu presented on the user interface in the edit view is a content catalog including the plurality of selectable graphic elements.

Although described in connection with an example computing device 100 and system 200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, servers, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:
1. A computer-implemented method comprising:
   presenting, on a display, a user interface including a background, the background including a first color, wherein the first color includes a first luminosity value, a first hue value, and a first saturation value;

receiving a first tint color having a second luminosity value, a second hue value, a second saturation value, and a first opacity value;

modifying the first luminosity value of the first color based on the first opacity value of the first tint color to generate a second color, the first opacity value representing a degree to which the first luminosity value of the first color is adjusted;

receiving a second tint color having a third luminosity value, a third hue value, a third saturation value, and a second opacity value;

modifying a hue value and a saturation value of the generated second color based on the second opacity value of the second tint color to generate a third color, the second opacity value representing a degree to which the hue value and the saturation value of the generated second color are adjusted;

generating a tinting material color that includes the modified luminosity value of the generated second color, the modified hue value of the third color, and the modified saturation value of the third color; and presenting, on the user interface, a user interface surface including a backdrop section, the backdrop section comprising the generated tinting material color.

2. The computer-implemented method of claim 1, wherein:

the background further includes an image overlaid on the first color, and the computer-implemented method further includes applying a blur layer to the background that blurs the image overlaid on the first color.

3. The computer-implemented method of claim 1, further comprising:

updating the background presented on the user interface to include an updated background color; and in response to updating the background to the updated background color, generating an updated tinting material color.

4. The computer-implemented method of claim 1, wherein the user interface surface comprises a first application, and further comprising:

presenting a second application on the user interface;
pushing the first application to an inactive status; and
in response to pushing the first application to the inactive status, updating the backdrop section of the first application to a neutral color indicating the inactive status.

5. The computer-implemented method of claim 1, wherein the generated tinting material color is presented on the user interface as a tinted version of the first color.

6. The computer-implemented method of claim 1, wherein:

the first luminosity value of the first color is increased in accordance with the first opacity value of the first tint color.

7. The computer-implemented method of claim 1, wherein:

the hue value and the saturation value of the generated second color are each increased in accordance with the first opacity value of the first tint color.

8. A system, comprising:

a memory storing instructions that are executable by a processor;

the processor configured to execute the instructions stored on the memory;

a display configured to present a user interface, the user interface comprising a background including a first color, wherein the first color includes a first luminosity value, a first hue value, and a first saturation value; and a tinting material generator, implemented on the processor, configured to:

receive a first tint color having a second luminosity value, a second hue value, a second saturation value, and a first opacity value, and modify the first luminosity value of the first color based on the first opacity value of the first tint color to generate a second color, the first opacity value representing a degree to which the first luminosity value of the first color is adjusted, receive a second tint color having a third luminosity value, a third hue value, a third saturation value, and a second opacity value, modify a hue value and a saturation value of the generated second color based on the second opacity value of the second tint color to generate a third color, the second opacity value representing a degree to which the hue value and the saturation value of the generated second color are adjusted, and generate a tinting material color that includes the modified luminosity value of the generated second color, the modified hue value of the third color, and the modified saturation value of the third color, wherein the display is further configured to present, on the user interface, a user interface surface including a backdrop section, the backdrop section comprising the generated tinting material color.

9. The system of claim 8, wherein the first opacity value of the first tint color is different than the second opacity value of the second tint color.

10. The system of claim 8, wherein:

the background further includes an image overlaid on the first color, and the tinting material generator is further configured to apply a blur layer to the background that blurs the image overlaid on the first color.

11. The system of claim 8, wherein:

the one display is further configured to update the background presented on the user interface to include an updated background color, and the tinting material generator is further configured to, in response to updating the background to the updated background color, generate an updated tinting material color.

12. The system of claim 8, wherein the user interface surface comprises a first application, and wherein the one display is further configured to:

present a second application on the user interface,
in response to presenting the second application, push the first application to an inactive status, and
in response to pushing the first application to the inactive status, update the backdrop section of the first application to a neutral color indicating the inactive status.

13. The system of claim 8, wherein the generated tinting material color is presented on the user interface as a tinted version of the first color.

14. The system of claim 8, wherein:

the first luminosity value of the first color is increased in accordance with the first opacity value of the first tint color.

15. The system of claim 8, wherein:

the hue value and the saturation value of the generated second color are each increased in accordance with the second opacity value of the second tint color.

16. A computer-storage memory device embodied with executable instructions that, when executed by a processor, cause the processor to:
- control a one display configured to present a user interface, the user interface comprising a background including a first color, wherein the first color includes a first luminosity value, a first hue value, and a first saturation value; and
- control a tinting material generator to:
  - receive a first tint color having a second luminosity value, a hue second value, a second saturation value, and a first opacity value,
  - modify the first luminosity value of the first color based on the first opacity value of the first tint color to generate a second color, the first opacity value representing a degree to which the first luminosity value of the first color is adjusted,
  - receive a second tint color having a third luminosity value, a third hue value, a third saturation value, and a second opacity value,
  - modify a hue value and a saturation value of the generated second color based on the second opacity value of the second tint color to generate a third color, the second opacity value representing a degree to which the hue value and the saturation value of the generated second color are adjusted, and
  - generate a tinting material color that includes the modified luminosity value of the generated second color, the modified hue value of the third color, and the modified saturation value of the third color,
- wherein the instructions further cause the processor to control the display to further present, on the user interface, a user interface surface including a backdrop section, the backdrop section comprising the generated tinting material color.

17. The computer-storage memory device of claim 16, wherein the instructions further cause the processor to:
- control the at least one display to further update the background presented on the user interface to include an updated background color, and
- control the tinting material generator to further, in response to updating the background to the updated background color, generate an updated tinting material color.

18. The computer-storage memory device of claim 16, wherein:
- the first luminosity value of the first color is increased in accordance with the first opacity value of the first tint color, and
- the hue value and the saturation value of the generated second color are each increased in accordance with the second opacity value of the second tint color.

19. The computer-storage memory device of claim 16, wherein the hue value and the saturation value of the generated second color are each increased in accordance with the second opacity value of the second tint color.

* * * * *